United States Patent [19]
Korody

[11] Patent Number: 4,850,454
[45] Date of Patent: Jul. 25, 1989

[54] DISC BRAKE LINING WEAR SENSOR

[75] Inventor: Mark A. Korody, Granger, Ind.

[73] Assignee: Allied-Signal Inc., Morristown, N.J.

[21] Appl. No.: 226,167

[22] Filed: Jul. 29, 1988

[51] Int. Cl.$^4$ .......................................... F16D 66/02
[52] U.S. Cl. ................................... 188/1.11; 116/208
[58] Field of Search ...................... 116/208; 188/1.11; 192/30 W; 340/52 A, 52 B

[56] References Cited

U.S. PATENT DOCUMENTS

| | | | |
|---|---|---|---|
| 3,649,959 | 3/1972 | Sakata et al. | 340/52 A |
| 3,961,690 | 6/1976 | Schanz et al. | 188/1.11 |
| 3,986,164 | 10/1976 | Hirai et al. | 340/52 A |
| 4,174,024 | 11/1979 | Hagiwara | 188/1.11 |
| 4,183,012 | 1/1980 | Kimura | 340/52 A |
| 4,311,214 | 1/1982 | Haraikawa et al. | 188/1.11 |
| 4,658,936 | 4/1987 | Moseley | 188/1.11 |
| 4,685,540 | 8/1987 | Rath et al. | 188/1.11 |

FOREIGN PATENT DOCUMENTS

| | | | |
|---|---|---|---|
| 2014588 | 10/1971 | Fed. Rep. of Germany . | |
| 2143660 | 3/1973 | Fed. Rep. of Germany | 188/1.11 |
| 3443246 | 5/1986 | Fed. Rep. of Germany . | |
| 58-101863 | 6/1983 | Japan . | |

*Primary Examiner*—Duane A. Reger
*Attorney, Agent, or Firm*—Larry J. Palguta; Ken C. Decker

[57] ABSTRACT

A disc brake lining wear sensor (40) comprises a plastic encapsulated lining wear sensor (40) having a support bracket (42) which is attached to a support member (12) of the disc brake (10). The inner brake pad (16) has a peripherally projecting portion (17) and the caliper (22) has a peripheral caliper projecting portion (23). The sensor (40) extends axially from a longitudinal mid-portion (46) into two oppositely disposed and axially extending end portions (48, 50). Each of the end portions (48, 50) is connected with the mid-portion (46) by a sloped or ramped surface (52, 54). A metal conductor (55) is encapsulated within the wear sensor (40) and disposed adjacent the surfaces (52, 54) of the end portions (48, 50). As the inner (20) and outer (21) linings wear, the peripheral portion (17) of the inner brake pad (16) is displaced axially by the piston (24) of the caliper (22) so that the projecting portion (17) wears away or erodes the associated surface (54) of the sensor (40) and engages the metal conductor (55) to complete a circuit. Likewise, the caliper (22) moves axially away from the rotor (14) as the outer lining (21) wears and the peripheral caliper projecting portion (23) wears away the plastic material of the associated surface (52) to engage the metal conductor (55) and activate a warning circuit.

4 Claims, 1 Drawing Sheet

DISC BRAKE LINING WEAR SENSOR

This invention relates generally to a disc brake lining wear sensor, in particular to a disc brake lining wear sensor which permits the inner brake pad and/or the caliper to wear away the sensor and complete a warning circuit.

Many disc brake lining wear sensors have been provided in order to enable the vehicle operator to be aware of when the brake pads need to be replaced. Many of the brake lining wear sensors are embedded within the friction material or lining of the brake pads which is an expensive manufacturing process, any many sensors provide a warning as a result of the wear of only one of the linings of the brake pads. It is desirable to provide an easily manufactured, inexpensive brake lining wear sensor which will provide a warning of inner brake pad lining wear and/or outer brake pad lining wear, either independently or simultaneously as the linings of the respective pads wear.

The present invention comprises a disc brake having a brake lining wear sensor, comprising a support member which supports a caliper, an inner brake pad and an outer brake pad each having a brake lining for engaging a respective side of a rotor, the inner brake pad displaced by a piston contained in the caliper and the outer brake pad displaced by the caliper, the inner brake pad having a peripherally projecting portion and the caliper having a peripheral caliper projecting portion, and the brake lining wear sensor attached to the support member, the brake lining wear sensor comprising an axially extending member having a longitudinal mid-portion disposed between axially extending end portions, each end portion connected with the longitudinal mid-portion by a sloped end surface which increases thereat the cross-sectional dimension of the sensor, the sensor including therein conductor means disposed adjacent a surface of the longitudinal mid-portion and the sloped end surfaces of the end portions, so that as either of the brake linings of the brake pads wears the respective projecting portion will contact and erode the respective sloped end surface and engage the conductor means.

One way of carrying out the invention is described in detail below with reference to the the drawings which illustrate an embodiment in which.

Figure 1:
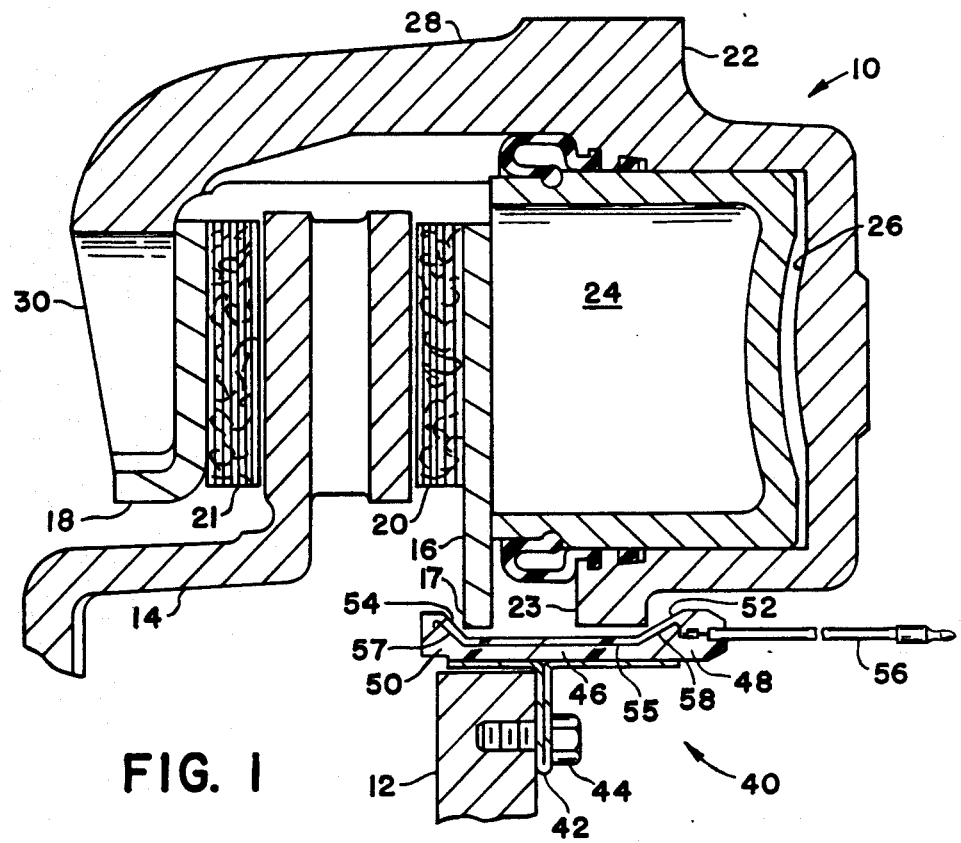
FIG. 1 illustrates a section view of the disc brake and lining wear sensor.

The disc brake of the present invention is indicated generally by reference numeral 10 in FIG. 1. Disc brake 10 includes a support member 12 which is disposed adjacent a rotor 14 that is engaged by brake pads 16 and 18. Inner brake pad 16 includes a friction material or lining 20, and outer brake pad 18 includes a lining 21. Disc brake 10 includes a caliper 22 housing a piston 24 in cavity 26, caliper 22 including an arch 28 extending into an axially outer arm 30 which engages outer brake pad 18. As is well known in the art, when piston 24 moves axially outwardly to displace inner brake pad 16 into engagement with rotor 14, caliper 22, by reaction, is displaced axially inwardly which displaces arm 30 against outer brake pad 18 to cause outer brake pad 18 to engage rotor 14. Inner brake pad 16 includes an inwardly and peripherally projecting portion 17 and caliper 22 includes an inwardly and peripherally projecting caliper portion 23.

The brake lining wear sensor is indicated generally by reference numeral 40 in FIG. 1. Sensor 40 comprises a support bracket 42 which is attached by means of a screw 44 to the support member 12, an axially extending longitudinal mid-portion 46 which extends into two oppositely disposed, axially extending end portions 48 and 50. The body of sensor 40 comprises a plastic encapsulating material. Encapsulated within the plastic material is a metal conductor 55 which is connected with a wire 56 that is part of a warning circuit. Metal conductor 55 is disposed adjacent the radially outward surfaces of sensor 40. Axially inner end portion 48 includes a sloped or ramp surface 52 which extends from mid-portion 46 in a radially outwardly direction, and likewise axially outer end portion 50 includes a sloped or ramp surface 54 which extends in a radially outwardly direction.

Figure 2:
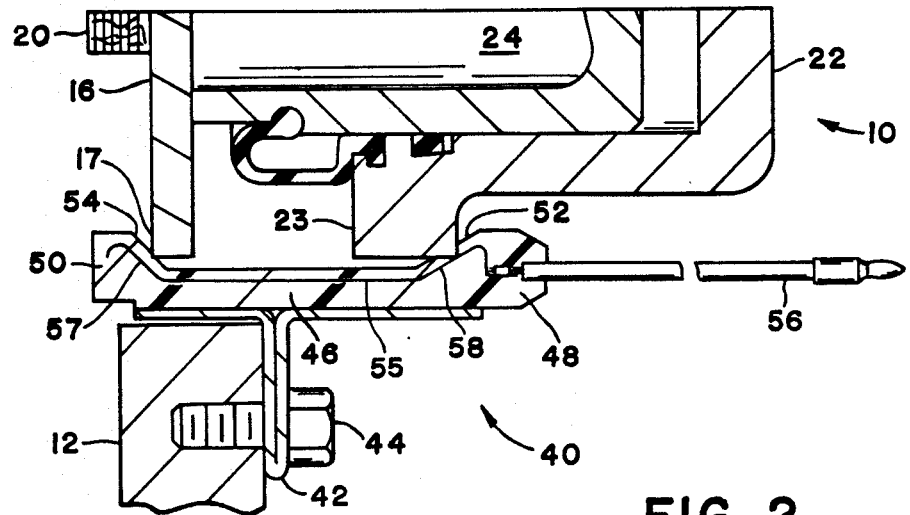
FIG. 2 illustrates the disc brake and lining wear sensor when the outer brake pad has experienced substantial wear.

Disc brake 10 and lining wear sensor 40 operate as follows in order to provide a warning to the vehicle operator when either one or both of the brake pads 16 and 18 have experienced sufficient wear to require their replacement. For example, as the lining 20 of inner brake pad 16 wears, the piston 24 displaces pad 16 closer to the surface of rotor 14 and peripherally projecting portion 17 advances to, contacts and erodes or wears away surface 54. When lining 20 has worn to a predetermined thickness, the projecting portion 17 will have worn away sufficient plastic material of sloped surface 54 so that portion 17 engages metal conductor 55 at end part 57 and causes the electric circuit to be grounded, thereby effecting the transmission of a signal to the vehicle operator that the brake pads should be serviced. Simultaneous with the wear of lining 20 of inner brake pad 16, lining 21 of outer brake pad 18 may also wear. As lining 21 of pad 18 wears, caliper 22 will be displaced further axially inwardly so that the peripherally projecting caliper portion 23 approaches, engages, and wears away the plastic material at ramp surface 52. When lining 21 of outer brake pad 18 has worn to a predetermined thickness (see FIG. 2), projecting caliper portion 23 will have worn away sufficient plastic material at ramp surface 52 so that portion 23 engages metal conductor 55 at axially inner part 58 to cause completion of the electrical circuit and the transmission of a warning signal to the vehicle operator. As should be apparent from the above description, the warning sensor provides the independent indication of the wear of the lining material of either one of the brake pads, and also the simultaneous indication of the wear of both brake pad linings. Thus, the sensor 40 may provide the vehicle operator with an appropriate warning that the brake pads need to be serviced, whether it be either one of the brake pads that needs to be replaced or both of the brake pads. The disc brake and lining wear sensor provide a warning mechanism that may be simply and inexpensively manufactured, which does not require the placement of probes within the linings of the brake pads, does not require electrical wires and probes to be placed on the axially outer brake pad, does not require wiring to be extended above and over the rotor whereby such wiring is exposed to damage, and provides a reliable and inexpensive mechanism for sensing independently and simultaneously the wear of each of the brake pads.

It is envisioned that sensor 40 may also comprise the main body portion thereof being made of a rigid, hard material such as plastic or a phenolic while the end areas about ramp surfaces 52 and 54 comprise a softer material or plastic that erodes easily so that parts 57 and 58 may be engaged by the respective portions 17 and 23.

Other provisions of the invention or variations will become apparent to those skilled in the art and will suggest themselves from the specific applications of the invention. It is intended that such variations and revisions of the invention, are as are to be expected on the part of those skilled in the art, to suit individual design preference and which incorporate the herein disclosed principles, will be included within the scope of the following claims as equivalents thereof.

I claim:

1. A disc brake having a brake lining wear sensor, comprising a support member which supports a caliper, an inner brake pad and an outer brake pad each having a brake lining for engaging a respective side of a rotor, the inner brake pad displaced by a piston contained in the caliper and the outer brake pad displaced by the caliper, the inner brake pad having a peripherally projecting portion and the caliper having a peripheral caliper projecting portion, and the brake lining wear sensor attached to the support member, the brake lining wear sensor comprising an axially extending member having a longitudinal mid-portion disposed between axially extending end portions, each end portion connected with the longitudinal mid-portion by a sloped end surface which increases thereat the cross-sectional dimension of the sensor, the sensor including therein conductor means disposed adjacent a surface of the longitudinal mid-portion and the sloped end surfaces of the end portions, so that as either of the brake linings of the brake pads wears the respective projecting portion will contact and erode the respective sloped end surface and engage the conductor means.

2. The disc brake and brake lining wear sensor in accordance with claim 1, wherein the lining wear sensor comprises a plastic material which encapsulates the conductor means.

3. The disc brake and brake lining wear sensor in accordance with claim 2, wherein the brake lining wear sensor includes a support bracket which is attached to the support member.

4. The disc brake and brake lining wear sensor in accordance with claim 3, wherein each sloped end surface comprises a ramp shaped surface which extends axially away from the mid-portion and radially outwardly in order to provide a surface for engagement by the respective projecting portion.

* * * * *